(12) United States Patent
Kwak

(10) Patent No.: US 11,849,054 B2
(45) Date of Patent: Dec. 19, 2023

(54) INTEGRATED CIRCUIT FOR PHYSICALLY UNCLONABLE FUNCTION AND METHOD OF OPERATING THE SAME

(71) Applicant: SAMSUNG ELECTRONICS CO., LTD., Suwon-si (KR)

(72) Inventor: Sung Ung Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

(21) Appl. No.: 17/199,944

(22) Filed: Mar. 12, 2021

(65) Prior Publication Data

US 2021/0399905 A1 Dec. 23, 2021

(30) Foreign Application Priority Data

Jun. 23, 2020 (KR) .................. 10-2020-0076760

(51) Int. Cl.
| | |
|---|---|
| *H04L 9/32* | (2006.01) |
| *G06F 21/60* | (2013.01) |
| *G06F 21/72* | (2013.01) |
| *G06F 21/75* | (2013.01) |

(52) U.S. Cl.
CPC .......... *H04L 9/3278* (2013.01); *G06F 21/602* (2013.01); *G06F 21/72* (2013.01); *G06F 21/75* (2013.01)

(58) Field of Classification Search
CPC ..... H04L 9/3278; G06F 21/602; G06F 21/72; G06F 21/75
See application file for complete search history.

(56) References Cited

U.S. PATENT DOCUMENTS

| | | | |
|---|---|---|---|
| 8,176,106 B2 | 5/2012 | Schrijen et al. | |
| 10,243,749 B2 | 3/2019 | Park et al. | |
| 10,361,700 B1 | 7/2019 | Lu | |
| 10,992,483 B2* | 4/2021 | Ju | G11C 13/0028 |
| 2017/0048072 A1* | 2/2017 | Cambou | G11C 15/046 |
| 2018/0102907 A1* | 4/2018 | Lin | G06F 21/44 |
| 2018/0183589 A1 | 6/2018 | Danger et al. | |
| 2019/0088325 A1* | 3/2019 | Wu | G11C 27/00 |
| 2019/0253266 A1* | 8/2019 | Lee | H04L 9/3278 |

(Continued)

FOREIGN PATENT DOCUMENTS

KR 10-1575807 B1 12/2015

*Primary Examiner* — Theodore C Parsons
*Assistant Examiner* — Alan L Kong
(74) *Attorney, Agent, or Firm* — Muir Patent Law, PLLC

(57) ABSTRACT

An integrated circuit for a physically unclonable function (PUF) includes a controller configured to generate a control signal with reference to an address table, the address table representing a first mapping relationship between a first PUF cell group and a second PUF cell group having a first predetermined mismatch distance in relation to a PUF cell characteristic, and representing a second mapping relationship between a third PUF cell group and a fourth PUF cell group having a second predetermined mismatch distance in relation to the PUF cell characteristic; and a PUF block configured to provide PUF cell data groups in accordance with the first and second mapping relationships to the controller, in response to the control signal. The controller may be configured to generate an authentication key by respectively comparing the PUF cell data groups with reference data groups.

18 Claims, 12 Drawing Sheets

(56) References Cited

U.S. PATENT DOCUMENTS

2019/0363714 A1* 11/2019 O'Dwyer .............. H04L 9/3278
2019/0363898 A1    11/2019 Ju et al.
2020/0026666 A1*  1/2020 Ju ....................... G06F 12/1475
2020/0396069 A1   12/2020 Kwak et al.

* cited by examiner

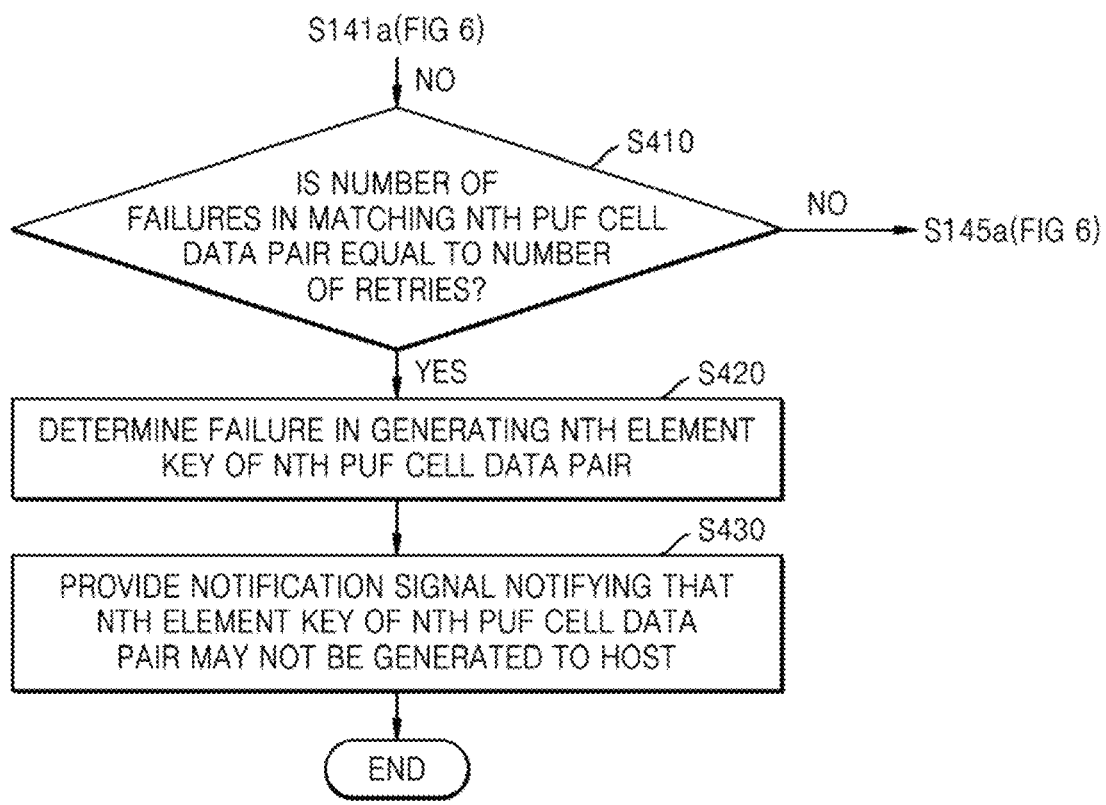

INTEGRATED CIRCUIT FOR PHYSICALLY UNCLONABLE FUNCTION AND METHOD OF OPERATING THE SAME

CROSS-REFERENCE TO RELATED APPLICATION

Korean Patent Application No. 10-2020-0076760, filed on Jun. 23, 2020, in the Korean Intellectual Property Office, and entitled: "Integrated Circuit for Physically Unclonable Function and Method of Operating the Same," is incorporated by reference herein in its entirety.

BACKGROUND

1. Field

Embodiments relate to a security technology, and more particularly, to a physically unclonable function (PUF) circuit.

2. Description of the Related Art

Recently, as a wired and wireless communication technology and a smart device related technology have been developed at a remarkable speed, demands on establishment of a security system capable of safely using the technologies have also been increasing.

SUMMARY

Embodiments are directed to an integrated circuit for a physically unclonable function (PUF), the integrated circuit including: a controller configured to generate a control signal with reference to an address table, the address table representing a first mapping relationship between a first PUF cell group and a second PUF cell group having a first predetermined mismatch distance in relation to a PUF cell characteristic, and representing a second mapping relationship between a third PUF cell group and a fourth PUF cell group having a second predetermined mismatch distance in relation to the PUF cell characteristic; and a PUF block configured to provide PUF cell data groups in accordance with the first and second mapping relationships to the controller, in response to the control signal. The controller may be configured to generate an authentication key by respectively comparing the PUF cell data groups with reference data groups.

Embodiments are also directed to an integrated circuit for a physically unclonable function (PUF), the integrated circuit including: a PUF block configured to include PUF cells; and a controller configured to receive PUF cell data pairs in accordance with a first mapping relationship and a second mapping relationship, the first mapping relationship being between a first PUF cell group and a second PUF cell group having a first predetermined mismatch distance in relation to a PUF cell characteristic, and the second mapping relationship being between a third PUF cell group and a fourth PUF cell group having a second predetermined mismatch distance in relation to the PUF cell characteristic. The controller may be configured to generate element keys that form an authentication key by respectively comparing the PUF cell data pairs with reference data pairs.

Embodiments are also directed to a method of operating an integrated circuit that includes a controller and a physically unclonable function (PUF) block, the method including: receiving an authentication key request at the controller; in response to the authentication key request received by the controller, providing a control signal from the controller to the PUF block, the control signal being for reading PUF cell data pairs corresponding to first PUF cells and second PUF cells that make pairs with the first PUF cells; in response to the control signal, providing the PUF cell data pairs from the PUF block to the controller; comparing the PUF cell data pairs respectively with reference data pairs, wherein the comparing is performed by the controller; and generating an authentication key from the controller based on a result of the comparison, the authentication key including element keys corresponding to the PUF cell data pairs.

BRIEF DESCRIPTION OF THE DRAWINGS

Features will become apparent to those of skill in the art by describing in detail example embodiments with reference to the attached drawings in which:

FIGS. 9 to 11 are flowcharts illustrating a method of generating an authentication key of the integrated circuit of FIG. 1 in the case of FIGS. 8A and 8B;

FIG. 12 is a view illustrating an address table for managing the number of retries according to an example embodiment;

DETAILED DESCRIPTION

Figure 1:
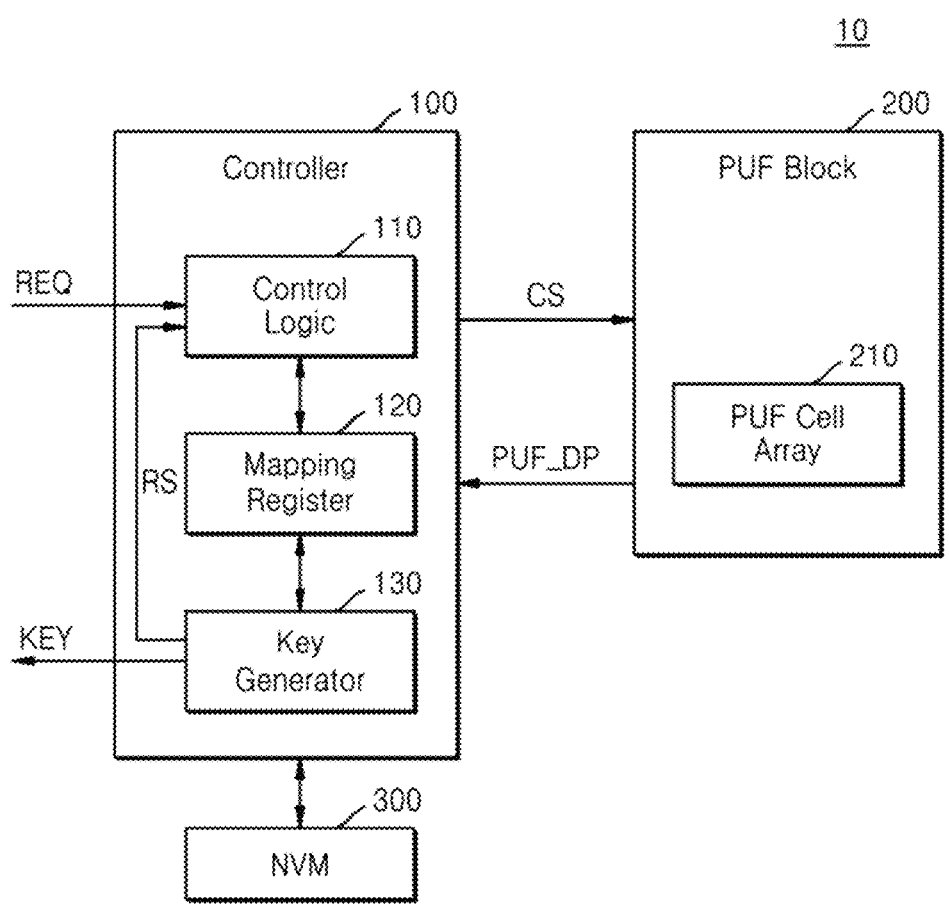
FIG. 1 is a block diagram illustrating an integrated circuit according to an example embodiment.
Figure 2:
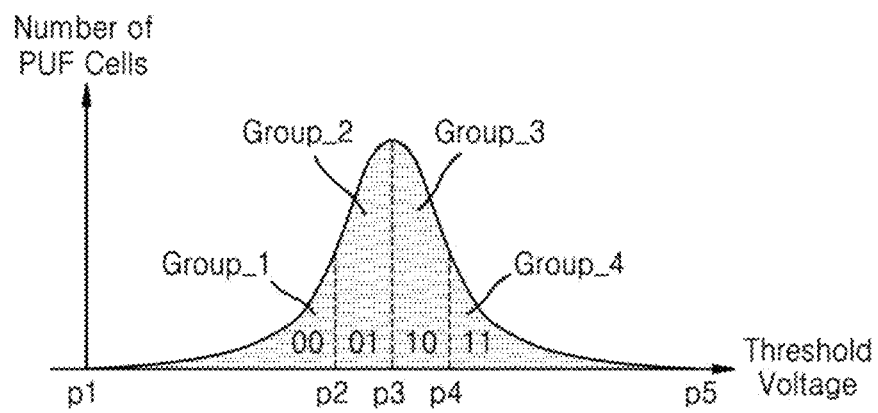
FIGS. 2 to 4 are views illustrating an example of an operation of the controller of FIG. 1.
Figure 3:
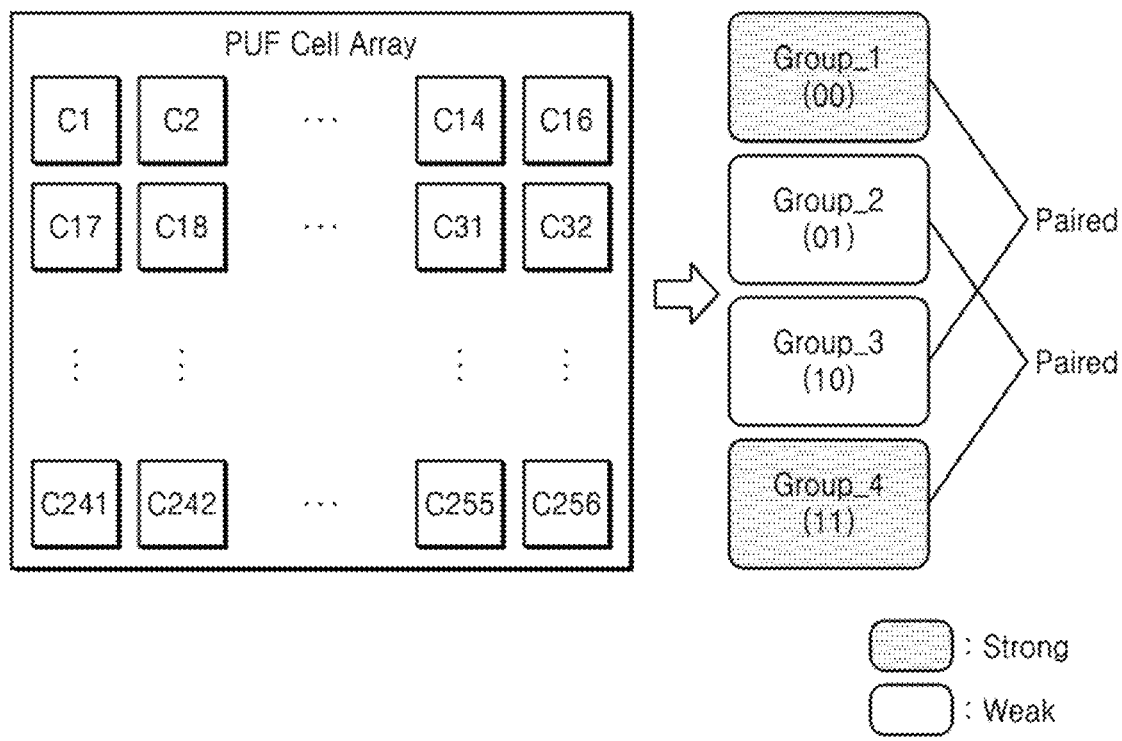
Figure 4:
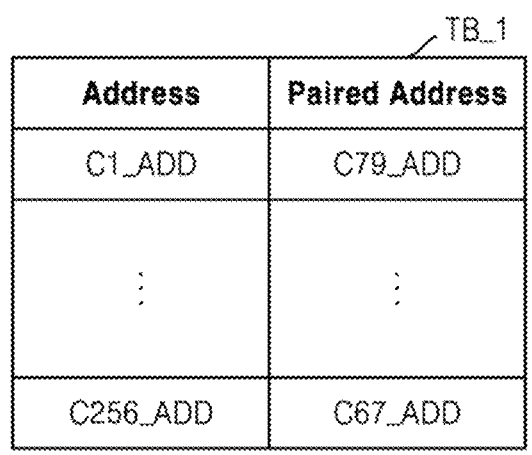

FIG. 1 is a block diagram illustrating an integrated circuit 10 according to an example embodiment. FIGS. 2 to 4 are views illustrating an example of an operation of the controller 100 of FIG. 1.

The integrated circuit 10 may be referred to as an integrated circuit or a device for supporting a physically unclonable function (PUF).

In some example embodiments, the integrated circuit 10 may be manufactured through a semiconductor processor and components of the integrated circuit 10 may be packaged in a single package or may be respectively packaged in two or more packages. In addition, the integrated circuit 10 may be mounted in each of various kinds of electronic devices on which encryption or security authentication of data is performed.

The integrated circuit 10 may generate an authentication key KEY in response to an authentication key request signal REQ from an external device (such as an external host or an external processor) and may provide the authentication key KEY to the external device. In some example embodiments, the external device may be a security device such as a cryptographic module or an authentication module.

Referring to FIG. 1, the integrated circuit 10 may include a controller 100, a PUF block 200, and a non-volatile memory 300. The controller 100 may generate the authentication key KEY by using the PUF block 200 in response to the authentication key request signal REQ received from the external host.

The controller 100 may include a control logic 110, a mapping register 120, and a key generator 130. The PUF block 200 may include a PUF cell array 210 including a plurality of PUF cells. The plurality of PUF cells of the PUF cell array 210 may generate unique signals having unique values in accordance with a PUF. The PUF may refer to controlling a unique value corresponding to hardware, based on an intrinsic characteristic of the hardware.

In some example embodiments, although a plurality of hardware components such as semiconductor chips are manufactured by the same process, the plurality of hardware components may not physically completely coincide with each other, such that small variations may occur in the plurality of hardware components. Unique values of the plurality of hardware components may be extracted based on the variations, and the extracted values may be used for applications requiring security, such as, for example, security communications, security data processing, user identification, and firmware updating.

In some example embodiments, each of the plurality of PUF cells of the PUF cell array 210 may have an arbitrary structure generating k-bit data with a unique value (k is an integer of no less than 2). In some example embodiments, each of the plurality of PUF cells may have a static random accessary memory (SRAM)-type PUF structure based on a value stored in an SRAM cell, a ring oscillator structure based on a frequency fluctuation, a leakage-based PUF structure based on a leakage current, or an arbiter PUF structure in which a path of a signal is arbitrarily determined. Furthermore, each of the plurality of PUF cells may have a PUF structure including resistance elements.

Hereinafter, each of the plurality of PUF cells is described as having a metal oxide semiconductor (MOS) transistor structure having a characteristic related to a unique threshold voltage, as merely an example embodiment. Each of various structures capable of having a unique characteristic in order to support the PUF may be applied to each of the plurality of PUF cells.

Hereinafter, operations of the control logic 110 and the key generator 130 included in the controller 100 may be mixed with an operation of the controller 100, and the controller 100 may be implemented by hardware or may be implemented to include arbitrary processing units executing a series of commands (or software). In some example embodiments, the controller 100 may be implemented by a field programmable gate array (FPGA) or an application-specific integrated circuit (ASIC).

The control logic 110 may provide a control signal CS (for reading a plurality of PUF cell data pairs PUF_DP that are used for generating the authentication key KEY) to the PUF block 200 in response to the authentication key request signal REQ with reference to an address table TB_1. Hereinafter, the plurality of PUF cell data pairs PUF_DP may be referred to as PUF cell data groups. The control signal CS may include signals used for outputting the plurality of PUF cell data pairs PUF_DP from desired PUF cells among the plurality of PUF cells of the PUF cell array 210. The plurality of PUF cells of the PUF cell array 210 may form a threshold voltage distribution and may be previously grouped in accordance with a magnitude of a threshold voltage.

Referring to FIG. 2, the plurality of PUF cells may be divided into a first PUF cell group Group_1 having a threshold voltage between a first reference point p1 and a second reference point p2, a second PUF cell group Group_2 having a threshold voltage between a second reference point p2 and a third reference point p3, a third PUF cell group Group_3 having a threshold voltage between a third reference point p3 and a fourth reference point p4, and a fourth PUF cell group Group_4 having a threshold voltage between a fourth reference point p4 and a fifth reference point p5. The above grouping may be previously performed by the controller 100 in the operation of setting the integrated circuit 10 before the integrated circuit 10 generates the authentication key KEY. The controller 100 may determine the first to fifth reference points p1 to p5 in the operation of setting the integrated circuit 10. The first to fifth reference points p1 to p5 may be determined so that the numbers of PUF cells respectively included in first to fourth PUF cell groups Group_1 to Group_4 are equal or similar to each other.

In some example embodiments, the PUF block 200 may be formed so that unique signals with unique values, which are generated by the plurality of PUF cells, may be provided to the controller 100 as PUF cell data with 2 bits. In some example embodiments, the PUF block 200 may output the PUF cell data with 2 bits by comparing the unique signals generated by the plurality of PUF cells with the third reference point p3 and then, the second or fourth reference point p2 or p4. Hereinafter, for convenience sake, the plurality of PUF cells may be described as outputting the PUF cell data.

In some example embodiments, the PUF cells included in the first PUF cell group Group_1 may output PUF cell data of "00", the PUF cells included in the second PUF cell group Group_2 may output PUF cell data of "01", the PUF cells included in the third PUF cell group Group_3 may output PUF cell data of "10", and the PUF cells included in the fourth PUF cell group Group_4 may output PUF cell data of "11".

Referring to FIG. 3, according to an example embodiment, the PUF cell array 210 may include 256 PUF cells C1 to C256. The PUF cells C1 to C256 may be divided into the first to fourth PUF cell groups Group_1 to Group_4 based on unique values of a cell characteristic (the cell characteristic may be, for example, a threshold voltage). The number of PUF cells included in the first to fourth PUF cell groups Group_1 to Group_4 may be 64 in each group, and may be equal to each other. In some example embodiments, the first PUF cell group Group_1 may be mapped to the third PUF cell group Group_3 to make a pair, and the second PUF cell group Group_2 may be mapped to the fourth PUF cell group Group_4 to make a pair.

In some example embodiments, the first PUF cell group Group_1 may be separated from the third PUF cell group Group_3 by a predetermined mismatch distance, and the second PUF cell group Group_2 may be separated from the fourth PUF cell group Group_4 by a predetermined mismatch distance. The mismatch distance may be generated because the PUF cells do not physically completely coincide with each other. The mismatch distance may be used to characterize PUF cell groups that are not adjacent to each other, and which are set as pairs.

In some example embodiments, the first and fourth PUF cell groups Group_1 and Group_4 may include strong PUF cells, and the second and third PUF cell groups Group_2 and Group_3 may include weak PUF cells. A strong PUF cell may output PUF cell data corresponding to a PUF cell group adjacent to a PUF cell group in which the strong PUF cell is included in low probability, and a weak PUF cell may output PUF cell data corresponding to a PUF cell group adjacent to a PUF cell group in which the strong PUF cell is included in high probability.

Therefore, based on PUF cell data output from the PUF cells of the first and fourth PUF cell groups Group_1 and Group_4, it may be determined whether PUF cell data output from the PUF cells of the second and third PUF cell groups Group_2 and Group_3 have the correct values. The PUF cell data output from the PUF cells of the first and fourth PUF cell groups Group_1 and Group_4 may have incorrect (or erroneous) values. A method of generating the authentication key KEY in this case is described with reference to FIGS. 8A to 10.

Referring to FIG. 4, the address table TB_1 may include information in which addresses of the PUF cells of the first PUF cell group Group_1 are mapped to addresses of the PUF cells of the third PUF cell group Group_3, and information in which addresses of the PUF cells of the second PUF cell group Group_2 are mapped to addresses of the PUF cells of the fourth PUF cell group Group_4 to fit a mapping relationship among the first to fourth PUF cell groups Group_1 to Group_4.

Referring to the example embodiment illustrated in FIG. 4, when a first PUF cell C1 makes a pair with a $79^{th}$ PUF cell C79 (as an example), then on the address table TB_1, an address C1_ADD of the first PUF cell C1 may be mapped to an address C79_ADD of the $79^{th}$ PUF cell C79. Further, when a $256^{th}$ PUF cell C256 makes pair with a $67^{th}$ PUF cell C67 (as another example), then on the address table TB_1, an address C256_ADD of the $256^{th}$ PUF cell C256 may be mapped to an address C67_ADD of the $67^{th}$ PUF cell C67.

In some example embodiments, the controller 100 may previously generate the address table TB_1 and may store the address table TB_1 in the non-volatile memory 300 in the operation of setting the integrated circuit 10. In some example embodiments, the address table TB_1 may be copied in the mapping register 120 from the non-volatile memory 300 in the operation of generating the authentication key KEY.

Referring to FIG. 1 again, with reference to a PUF cell corresponding to at least one address included in the authentication key request signal REQ and the address table TB_1, the control logic 110 may provide the control signal CS for reading a PUF cell data pair PUF_DP output from a PUF cell making a pair with the corresponding PUF cell to the PUF block 200. In some example embodiments, when the authentication key request signal REQ including the address C1_ADD of the first PUF cell C1 is received, the control logic 110 may determine the address C79_ADD of the $79^{th}$ PUF cell C79 making a pair with the first PUF cell C1 with reference to the address table TB_1, and then may provide the control signal CS for reading PUF cell data pairs PUF_DP corresponding to the first PUF cell C1 and the $79^{th}$ cell C79 to the PUF block 200.

In some example embodiments, the key generator 130 may compare the plurality of PUF cell data pairs PUF_DP received from the PUF block 200 with reference data pairs, respectively, and may generate the authentication key KEY. The reference data pairs may also be referred to as reference data groups.

The authentication key KEY may include a plurality of element keys, each of which is generated by one PUF cell data pair. In some example embodiments, the key generator 130 may generate an $n^{th}$ element key with a value fitting a reference data pair matched with an $n^{th}$ PUF cell data pair in the $n^{th}$ PUF cell data pair among the plurality of PUF cell data pairs PUF_DP. Hereinafter, matching may mean that data pairs coincide with each other. On the other hand, the key generator 130 may provide a matching result signal RS to the control logic 110 when the $n^{th}$ PUF cell data pair does not match with any of the reference data pairs, and the control logic 110 may retry to generate the $n^{th}$ element key corresponding to the $n^{th}$ PUF cell data pair in response to the matching result signal RS. That is, when the $n^{th}$ PUF cell data pair with an incorrect value is output from the PUF block 200, the control logic 110 may provide the control signal CS to the PUF block 200 again so that the $n^{th}$ PUF cell data pair with a correct value may be output from the PUF block 200. The key generator 130 may generate the $n^{th}$ element key by comparing the read $n^{th}$ cell data pair with the reference data pairs.

In some example embodiments, the number of retries of the generation of the $n^{th}$ element key may be predetermined and, when the number of retries is greater than the predetermined number, the control logic 110 may update the address table TB_1 so that PUF cells (hereinafter, referred to as non-available PUF cells) corresponding to the corresponding PUF cell data pair may not be used for generating the authentication key KEY. Furthermore, the control logic 110 may generate a notification signal notifying the non-available PUF cells and may provide the notification signal to an external host.

In some example embodiments, the controller 100 may determine the number of retries in the operation of setting the integrated circuit 10, and the numbers of retries may be equal to or different from each other in PUF cells or PUF cell groups. A method, performed by the controller 100, of determining the number of retries will be described later with reference to FIGS. 14A and 14B.

The integrated circuit 10 may provide the authentication key KEY generated by the above-described method to an external host.

The integrated circuit 10 according to an example embodiment may read the plurality of PUF cell data pairs PUF_DP with reference to the address table TB_1 representing a mapping relationship among the PUF cell groups, and may generate the authentication key KEY with a reduced bit error rate and enhanced reliability by using the plurality of read PUF cell data pairs.

In addition, because the integrated circuit 10 does not use an additional analog-digital converter (ADC) in order to generate the authentication key KEY, the integrated circuit 10 may be designed to be small, and manufacturing cost of the integrated circuit 10 may be reduced.

Figure 5:
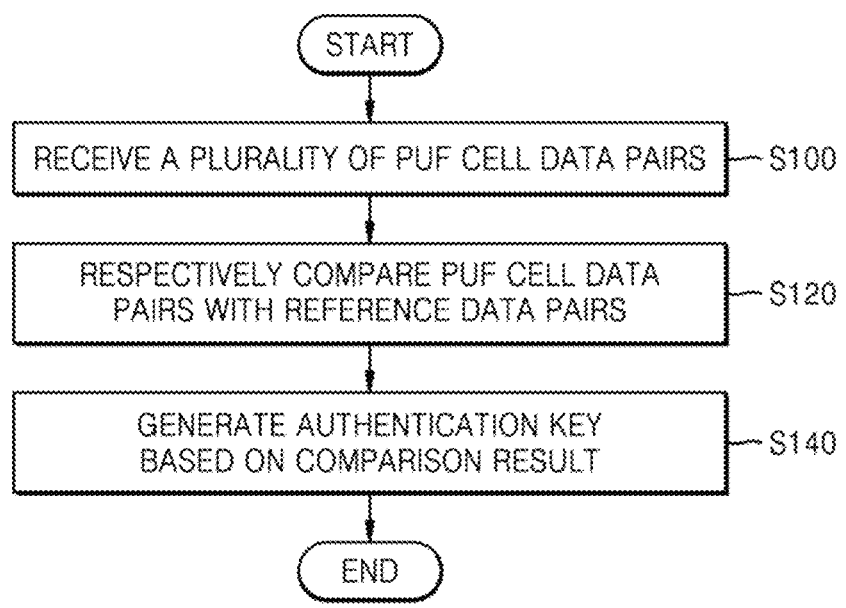
FIG. 5 is a flowchart illustrating a method of operating the integrated circuit of FIG. 1.

FIG. 5 is a flowchart illustrating a method of operating the integrated circuit 10 of FIG. 1.

Referring to FIGS. 1 and 5, in operation S100, the controller 100 may receive the plurality of PUF cell data pairs PUF_DP from the PUF block 200. The plurality of PUF cell data pairs PUF_DP may be output from PUF cells included in PUF cell groups mapped with each other to have a predetermined mismatch distance that is related to a PUF cell characteristic.

In operation S120, the controller 100 may respectively compare the plurality of PUF data pairs PUF_DP with the reference data pairs. The reference data pairs may have values capable of determining whether the plurality of PUF data pairs PUF_DP have the correct values, and may be determined by values respectively representing the first to fourth PUF cell groups Group_1 to Group_4 of FIG. 2.

In operation S140, the controller 100 may generate the authentication key KEY that includes element keys corresponding to the plurality of PUF data pairs PUF_DP, based on the comparison result of operation S120.

Figure 6:
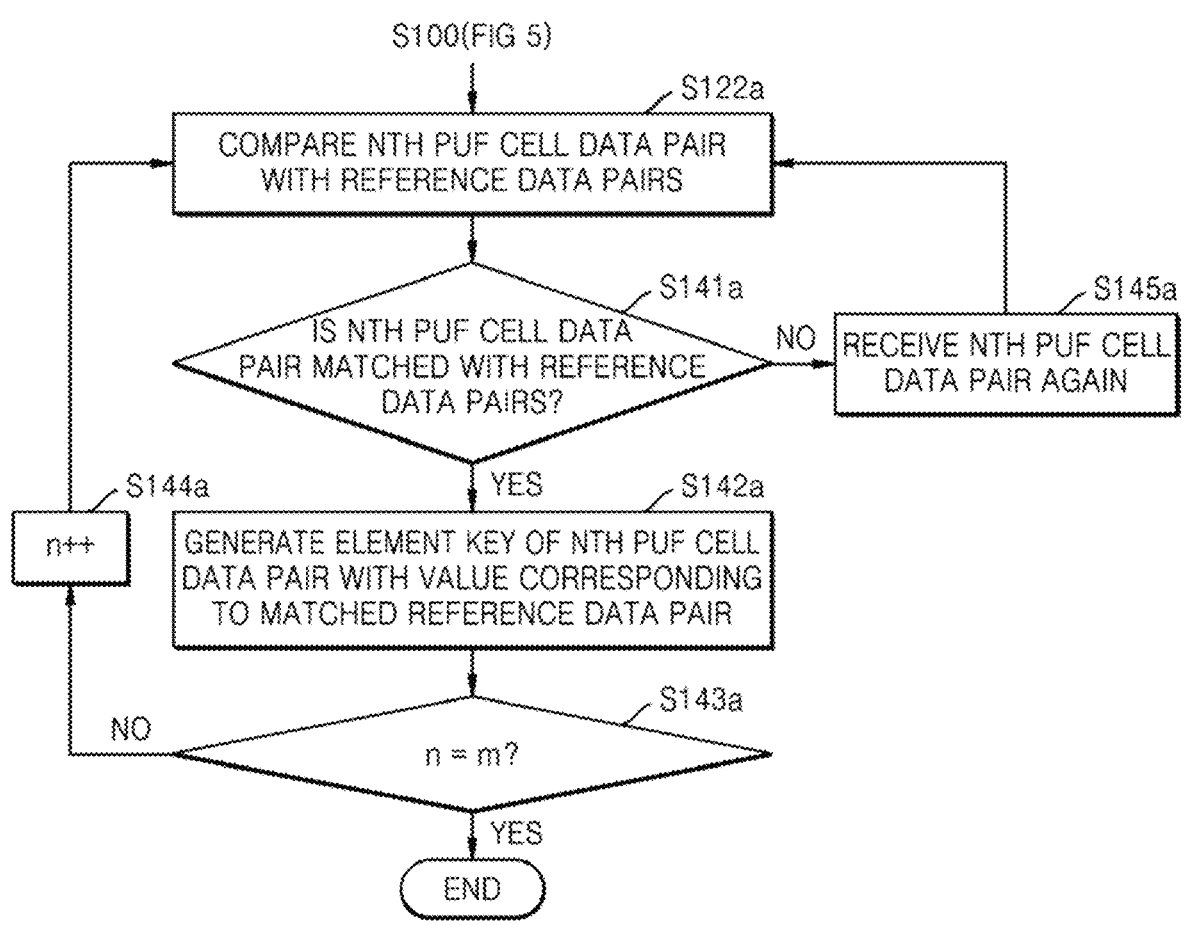
FIG. 6 is a flowchart illustrating details of an example embodiment of operations S120 and S140 of FIG. 5.

FIG. 6 is a flowchart illustrating details of an example embodiment of operations S120 and S140 of FIG. 5.

Referring to FIGS. 1 and 6, subsequent to operation S100 (FIG. 5), in operation S122a, the controller 100 may compare the $n^{th}$ PUF cell data pair with the reference data pairs.

In operation S141a, the controller 100 may determine whether the $n^{th}$ PUF cell data pair is matched with one of the reference data pairs. When it is determined in operation S141a that the $n^{th}$ PUF cell data pair is matched with one of the reference data pairs, then in operation S142a, the controller 100 may generate an element key of the $n^{th}$ PUF cell data pair with the value corresponding to the reference data pair matched with the $n^{th}$ PUF cell data pair.

In operation S143a, the controller 100 may determine whether 'n' reaches 'm', which is the number of read PUF cell data pairs. When it is determined in operation S143a that 'n' has not reached 'm' (which is the number of read PUF cell data pairs), then 'n' is counted up in operation S144a, and operation S122a may follow.

When it is determined in operation S141a that the $n^{th}$ PUF cell data pair is not matched with one of the reference data pairs, then, in operation S145a, the controller 100 may receive the $n^{th}$ PUF cell data pair again from the PUF block 200. Then, operation S122a may follow.

Figure 7:
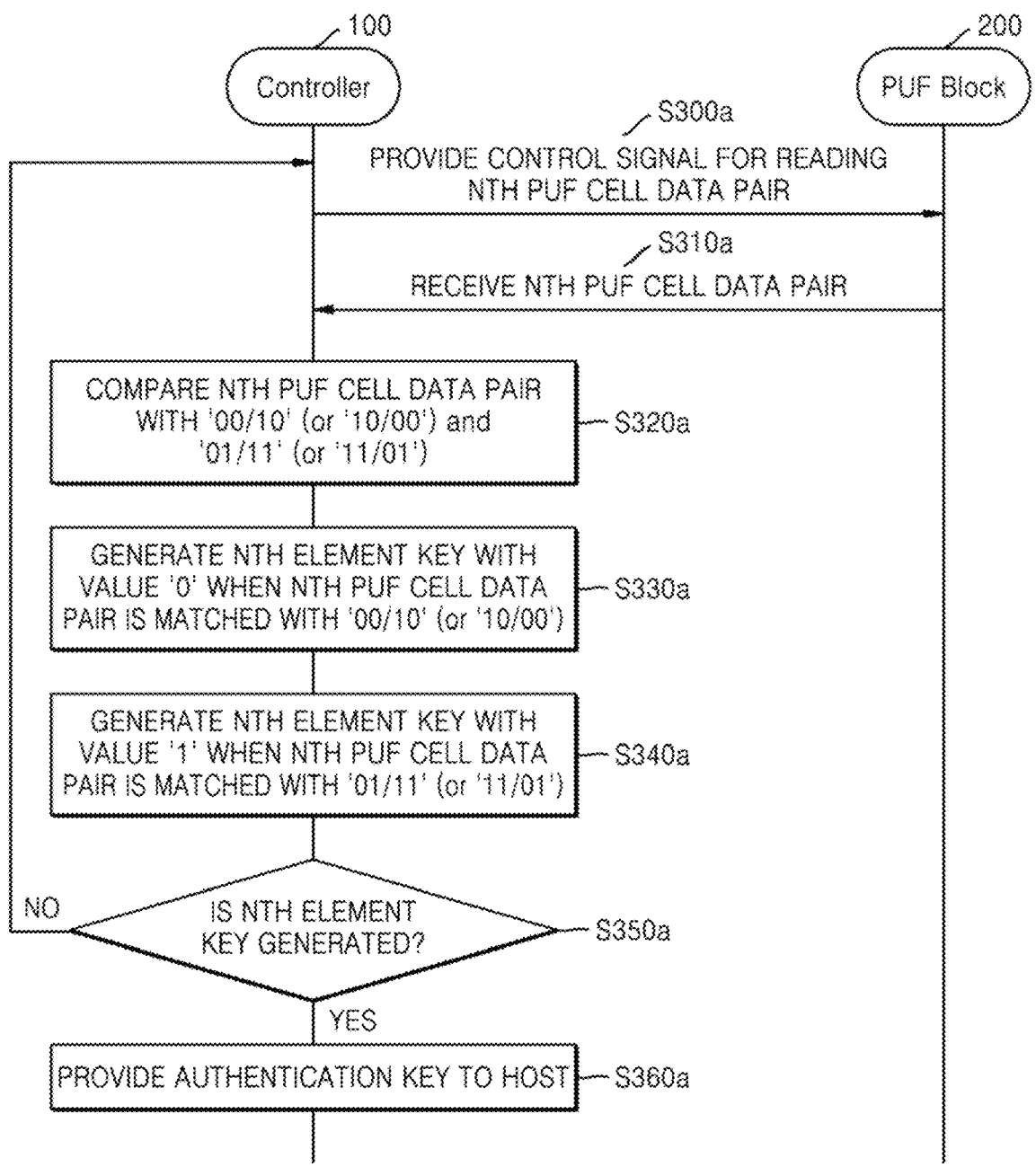
FIG. 7 is a flowchart illustrating details of a method of generating an element key of the integrated circuit of FIG. 1.

FIG. 7 is a flowchart illustrating a detailed method of generating an element key of the integrated circuit 10 of FIG. 1. Hereinafter, in order to help understanding, the description given with respect to FIG. 2 is premised.

Referring to FIGS. 1 and 7, in operation S300a, the controller 100 may provide a control signal for reading the $n^{th}$ PUF cell data pair to the PUF block 200. In operation S310a, the controller 100 may receive the $n^{th}$ PUF cell data pair from the PUF block 200. In operation S320a, the $n^{th}$ PUF cell data pair may be compared with each of '00/10' (or '10/00') and '01/11' (or '11/01'). A reference data pair of '00/10' (or '10/00') may be for determining whether the $n^{th}$ PUF cell data pair corresponds to the mapped first and third PUF cell groups Group_1 and Group_3, and a reference data pair of '01/11' (or '11/01') may be for determining whether the $n^{th}$ PUF cell data pair corresponds to the mapped second and fourth PUF cell groups Group_2 and Group_4.

When it is determined in operation S330a that the $n^{th}$ PUF cell data pair is matched with '00/10' (or '10/00'), the controller 100 may generate the $n^{th}$ element key with a value '0'. When it is determined in operation S340a that the $n^{th}$ PUF cell data pair is matched with '01/11' (or '11/01'), the controller 100 may generate the $n^{th}$ element key with a value '1'. On the other hand, when the $n^{th}$ PUF cell data pair is not matched with both '00/10' (or '10/00') and '01/11' (or '11/01'), the controller 100 may not generate the $n^{th}$ element key. In operation S350a, the controller 100 determines whether the $n^{th}$ element key is generated. When it is determined in operation S350a that the $n^{th}$ element key is generated, operation S360a is subsequently performed so that the authentication key KEY including the $n^{th}$ element key may be provided to the external host. When it is determined in operation S350a that the $n^{th}$ element key is not generated, subsequent operation S300a is performed so that the $n^{th}$ PUF cell data pair may be re-read from the PUF block 200.

Figure 8A:
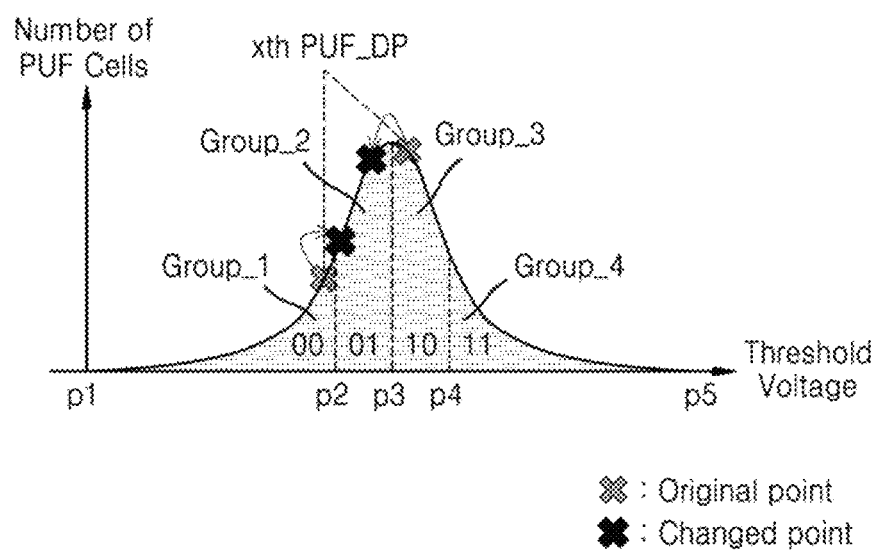
FIGS. 8A and 8B are graphs illustrating that all physically unclonable function (PUF) cells of mapped PUF cell groups output wrong PUF cell data items.
Figure 8B:
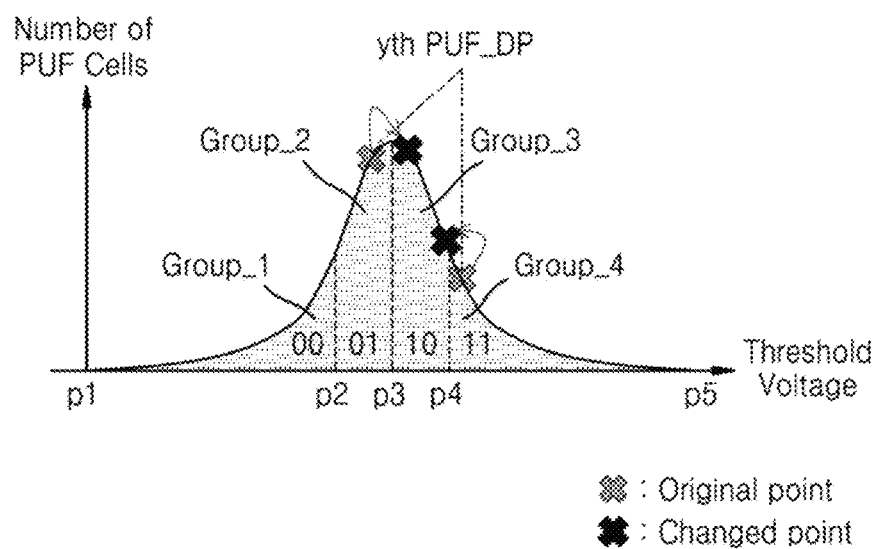
Figure 9:
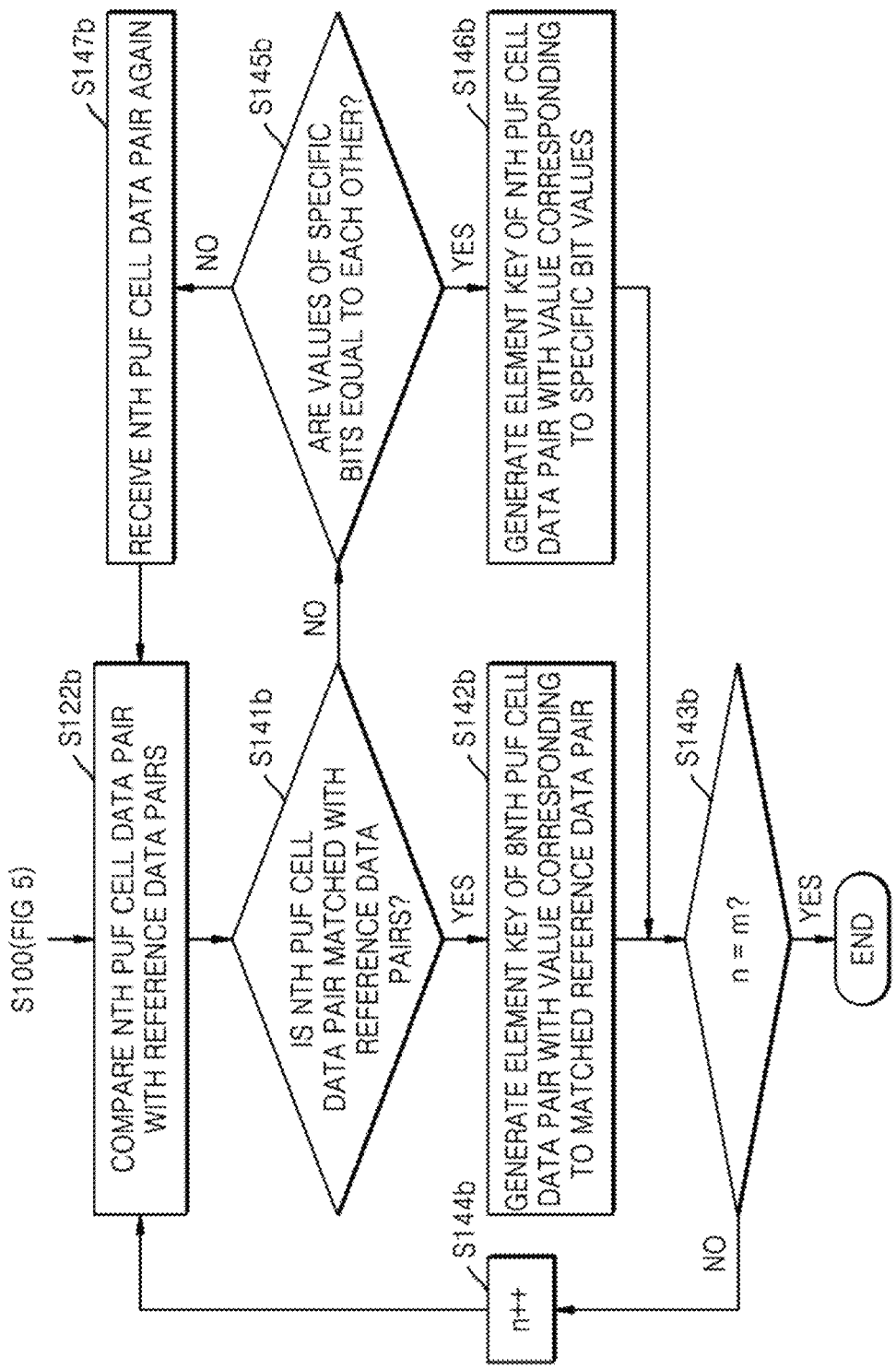
Figure 10:
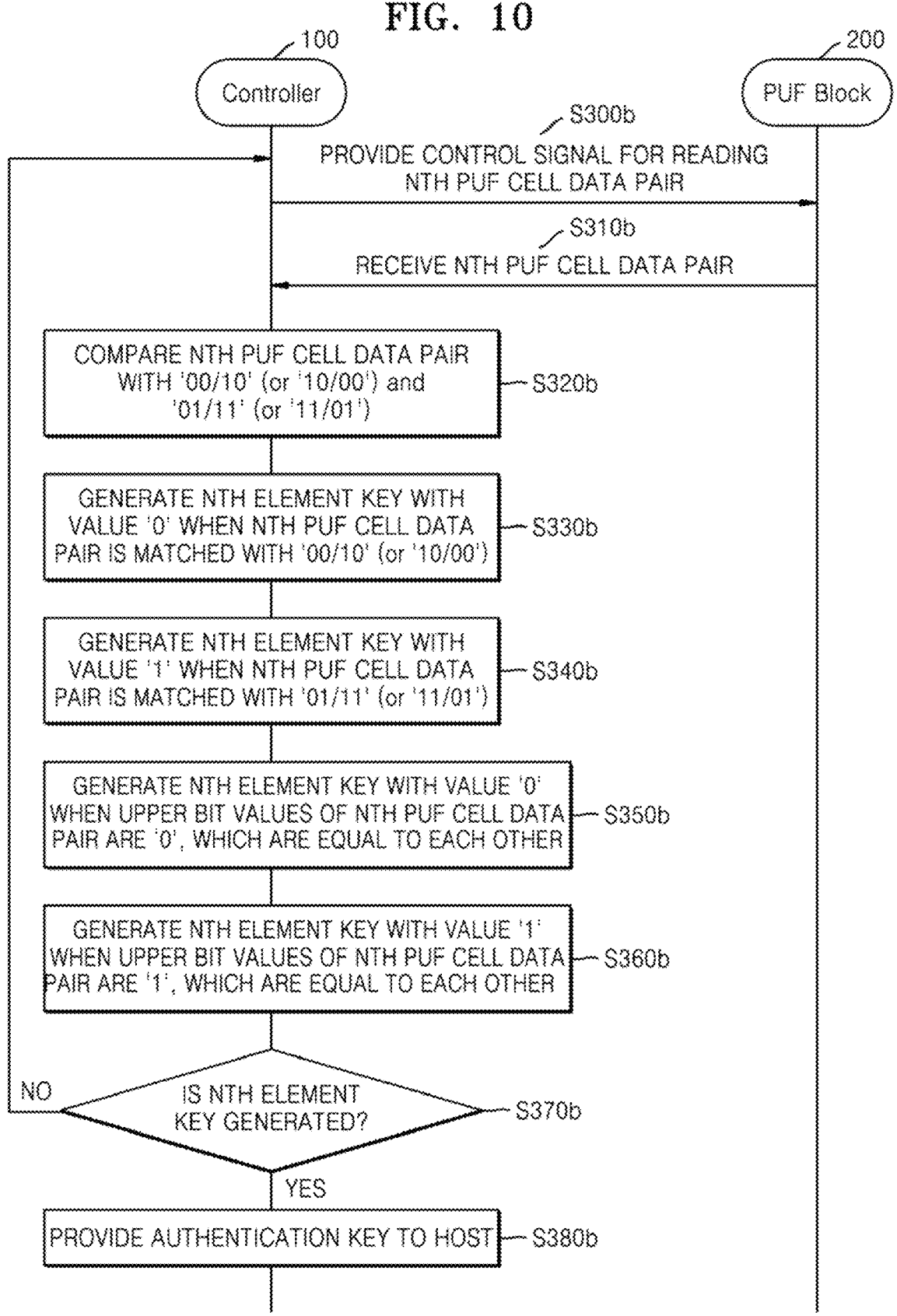

FIGS. 8A and 8B are graphs illustrating that all PUF cells of mapped PUF cell groups output incorrect PUF cell data. FIGS. 9 to 11 are flowcharts illustrating a method of generating an authentication key of the integrated circuit 10 of FIG. 1 in the case of FIGS. 8A and 8B.

Referring to FIG. 8A, an $x^{th}$ PUF cell data pair $x^{th}$ PUF_DP is output from the PUF cells included in the first and third PUF cell groups Group_1 and Group_3 mapped with each other, and is to have a unique value '00/10 (or '10/00'). However, due to various factors, all characteristics of the corresponding PUF cells may change so that the $x^{th}$ PUF cell data pair $x^{th}$ PUF_DP may have a value '01/01'.

Referring to FIG. 8B furthermore, a $y^{th}$ PUF cell data pair $y^{th}$ PUF_DP is output from the PUF cells included in the second and fourth PUF cell groups Group_2 and Group_4 mapped with each other, and is to have a unique value '01/11 (or '11/01'). However, due to various factors, all characteristics of the corresponding PUF cells may change so that the $y^{th}$ PUF cell data pair $y^{th}$ PUF_DP may have a value '10/10'.

When the $x^{th}$ and $y^{th}$ PUF cell data pairs $x^{th}$ PUF_DP and $y^{th}$ PUF_DP respectively have the values '01/01' and '10/10' and are not matched with the reference data pairs, as illustrated in FIG. 7, the controller 100 may have to retry to generate element keys corresponding to the $x^{th}$ and $y^{th}$ PUF cell data pairs $x^{th}$ PUF_DP and $y^{th}$ PUF_DP.

The integrated circuit 10 according to an example embodiment may generate the element keys at one time by using the mapping relationship among the first to fourth PUF cell groups Group_1 to Group_4 in FIGS. 8A and 8B.

FIG. 9 is a flowchart illustrating details of an example embodiment of operations S120 and S140 of FIG. 5.

In FIG. 9, because operations S100, S122b, and S141b to S144b are previously described with reference to FIG. 6, detailed description thereof is omitted.

Referring to FIGS. 1 and 9, when it is determined in operation S141b that the $n^{th}$ PUF cell data pair is not matched with one of the reference data pairs, operation S145b is subsequently performed so that the controller 100 may determine whether values of specific bits of the $n^{th}$ PUF cell data pair are equal to each other. In some example embodiments, the specific bits may represent whether each of the corresponding PUF cells of the $n^{th}$ PUF cell data pair has an upper or lower 50% threshold voltage. At this time, referring to FIG. 2, the specific bits may correspond to upper bits. In some example embodiments, the specific bits may correspond to lower bits. On the other hand, because specific bits (or upper bits) of the $x^{th}$ and $y^{th}$ PUF cell data pairs $x^{th}$ PUF_DP and $y^{th}$ PUF_DP are respectively '0' and '1', which are equal to each other, operation S146b may be subsequently performed. When it is determined in operation S145b that values of the specific bits of the $n^{th}$ PUF cell data pair are equal to each other, in subsequent operation S146b, the controller 100 may generate an element key of the $n^{th}$ PUF cell data pair with a value fitting the specific bit values.

In some example embodiments, the controller 100 may generate an element key of the $x^{th}$ PUF cell data pair $x^{th}$ PUF_DP with the value '0' considering the value of the specific bit (or the upper bit) of the $x^{th}$ PUF cell data pair $x^{th}$ PUF_DP. In addition, the controller 100 may generate an element key of the $y^{th}$ PUF cell data pair $y^{th}$ PUF_DP with the value '1' considering the value of the specific bit (or the upper bit) of the $y^{th}$ PUF cell data pair $y^{th}$ PUF_DP. As a result, in comparison with operation S330a of FIG. 7, the element key with the value '0' corresponding to the $x^{th}$ PUF cell data pair $x^{th}$ PUF_DP may be properly generated and, in comparison with operation S340a of FIG. 7, the element key with the value '1' corresponding to the $y^{th}$ PUF cell data pair $y^{th}$ PUF_DP may be properly generated.

When it is determined in operation S145b that the values of the specific bits of the $n^{th}$ PUF cell data pair are not equal to each other, in subsequent operation S147b, the controller 100 may receive the $n^{th}$ PUF cell data pair again from the PUF block 200. Then, operation S122b may be subsequently performed.

FIG. 10 is a flowchart illustrating a detailed method of generating an element key of the integrated circuit 10 of FIG. 1. Hereinafter, in order to help understanding, the description given with respect to FIGS. 8A and 8B is premised. In addition, because operations S300b to S340b and S370b to S380b are previously described with reference to FIG. 7, detailed description thereof is omitted.

Referring to FIG. 10, in operation S350b subsequent to operation S340b, the controller 100 may generate the $n^{th}$ element key with the value '0' when the upper bit values of the $n^{th}$ PUF cell data pair are '0', which are equal to each other. In operation S360b, the controller 100 may generate the $n^{th}$ element key with the value '1' when the upper bit values of the $n^{th}$ PUF cell data pair are '1', which are equal to each other. As described above, although the $n^{th}$ PUF cell data pair is not matched with the reference data pairs, the controller 100 may generate the $n^{th}$ element key based on a relationship among the PUF cell groups mapped with each other.

FIG. 11 is a flowchart illustrating a method of generating an authentication key with a limited number of retries of an element key according to an example embodiment.

Referring to FIGS. 1 and 11, when it is determined in operation S141a (FIG. 5) that the $n^{th}$ PUF cell data pair is not matched with one of the reference data pairs, in subsequent operation S410, the controller 100 may determine whether the number of matching failures of the $n^{th}$ PUF cell data pair reaches the number of retries. When it is determined in operation S410 that the number of matching failures of the $n^{th}$ PUF cell data pair does not reach the number of retries, subsequent operation S145a (FIG. 6) may be performed. In some example embodiments, the controller 100 may previously determine the number of retries in the operation of setting the integrated circuit 10. The numbers of retries in the PUF cells of the PUF block 200 may be equal to each other or, in some example embodiments, may be different from each other in PUF cell groups or PUF cell subgroups. A plurality of PUF cell subgroups may form a PUF cell group. A determination of the number of retries according to an example embodiment is described with reference to FIGS. 14A and 14B. When it is determined in operation S410 that the number of matching failures of the $n^{th}$ PUF cell data pair reaches the number of retries, the controller 100 may determine failure of the $n^{th}$ PUF cell data pair to generate the $n^{th}$ element key. In some example embodiments, because the controller 100 determines that the $n^{th}$ PUF cell data pair may not be used for generating the authentication key KEY, in order to avoid unnecessary access to the PUF cells corresponding to the $n^{th}$ PUF cell data pair, an update operation of deleting address information on the corresponding PUF cells from the address table TB_1 may be performed. In operation S430, the controller 100 may provide a notification signal notifying that the $n^{th}$ element key of the $n^{th}$ PUF cell data pair may not be generated to the external host. The external host may consider the above situation when the notification signal is determined and the authentication key KEY is requested.

As described above, the integrated circuit supporting the PUF may increase reliability and an authentication key generating speed by limiting the number of retries, and thus, excluding PUF cells that prevent the authentication key KEY from being generated.

FIG. 12 is a view illustrating an address table TB_2 for managing the number of retries according to an example embodiment.

Referring to FIG. 12, in comparison with the address table TB_1 of FIG. 4, the address table TB_2 may further include information on the number of retries. In some example embodiments, the number of retries to generate an element key of the PUF cell data pair corresponding to the address C1_ADD of the first PUF cell and the address C79_ADD of the $79^{th}$ PUF cell, which are mapped with each other, may correspond to a first number RC1. The number of retries to generate an element key of the PUF cell data pair corresponding to the address C256_ADD of the $256^{th}$ PUF cell and the address C67_ADD of the $67^{th}$ PUF cell, which are mapped with each other, may correspond to a second number RC2. When a predetermined PUF cell data pair is not matched with the reference data pairs, the controller 100 may determine the number of retries corresponding to the corresponding PUF cell data pair from the address table TB_2, may read the corresponding PUF cell data pair by the number of retries, and may perform an operation of matching the corresponding PUF cell data pair with the reference data pairs again. Although it has been described that the number of retries is managed by the address table TB_2, the number of retries may be managed by various methods.

Figure 13:
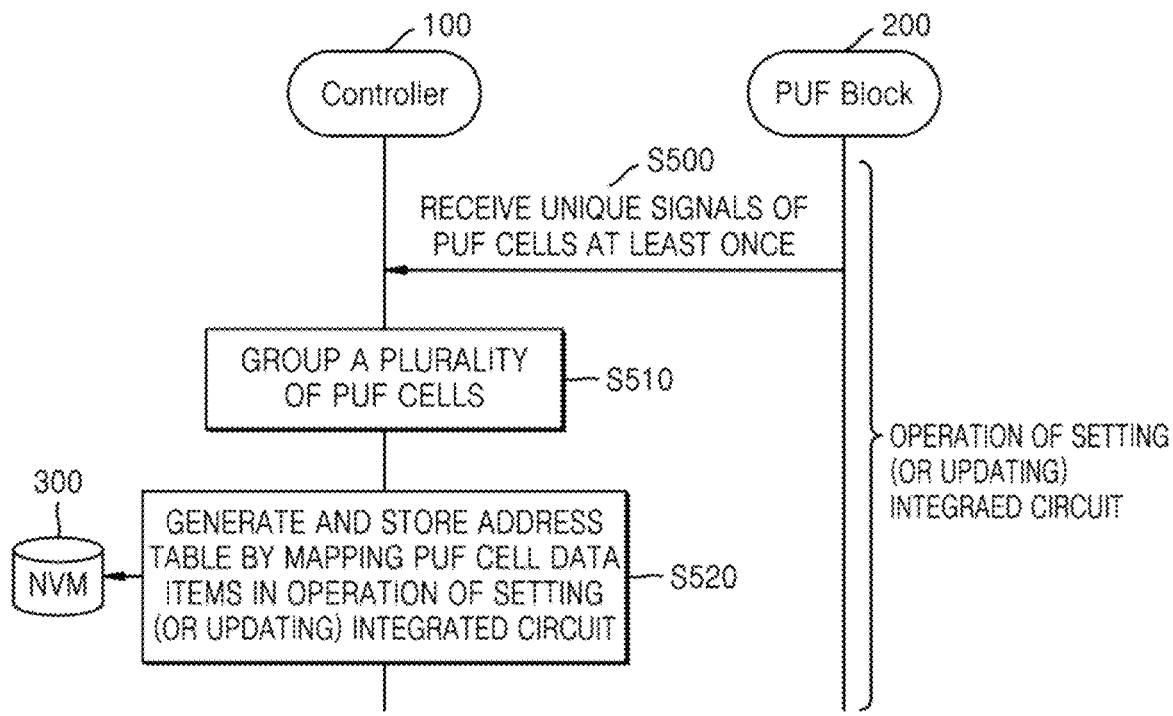
FIG. 13 is a flowchart illustrating operation of setting (or updating) the integrated circuit of FIG. 1.

FIG. 13 is a flowchart illustrating operation of setting (or updating) the integrated circuit 10 of FIG. 1. Hereinafter, in order to help understanding, the description given with respect to FIG. 2 is premised.

Referring to FIGS. 1 and 13, in operation S500, the controller 100 may receive unique signals of the plurality of PUF cells from the PUF block 200 at least once in the operation of setting (or updating) the integrated circuit 10. The controller 100 may generate or update the address table used for generating the authentication key KEY before the authentication operation by using the unique signals of the received PUF cells. In operation S510, the controller 100 may group the plurality of PUF cells of the PUF block 200. In some example embodiments, the controller 100 may generate the threshold voltage distribution of FIG. 2 by analyzing values of the unique signals of the plurality of PUF cells. The controller 100 may divide the plurality of PUF cells into the first to fourth PUF cell groups Group_1 to Group_4 considering the values of the unique signals of the plurality of PUF cells. In addition, the controller 100 may determine the second to fourth reference points p2 to p4 that are used to represent the unique signals from the plurality of PUF cells as 2-bit data. In operation S520, the controller 100 may map PUF cell groups having a predetermined mismatch distance, and may generate an address table representing a mapping relationship among the PUF cell groups. Because the address table is described in detail with reference to FIGS. 4 and 12, description thereof is omitted. The controller 100 may store the generated address table in the non-volatile memory 300. In addition, the controller 100 may delete the unique signals of the plurality of PUF cells stored in a predetermined register to generate the address table, for security.

The controller 100 may periodically or aperiodically update the address table considering that the unique characteristic of the plurality of PUF cells of the PUF block 200 may be irreversibly changed by various factors. At this time, the controller 100 may update the address table by grouping the plurality of PUF cells of the PUF block 200 again and mapping the PUF cell groups again.

Figure 14A:
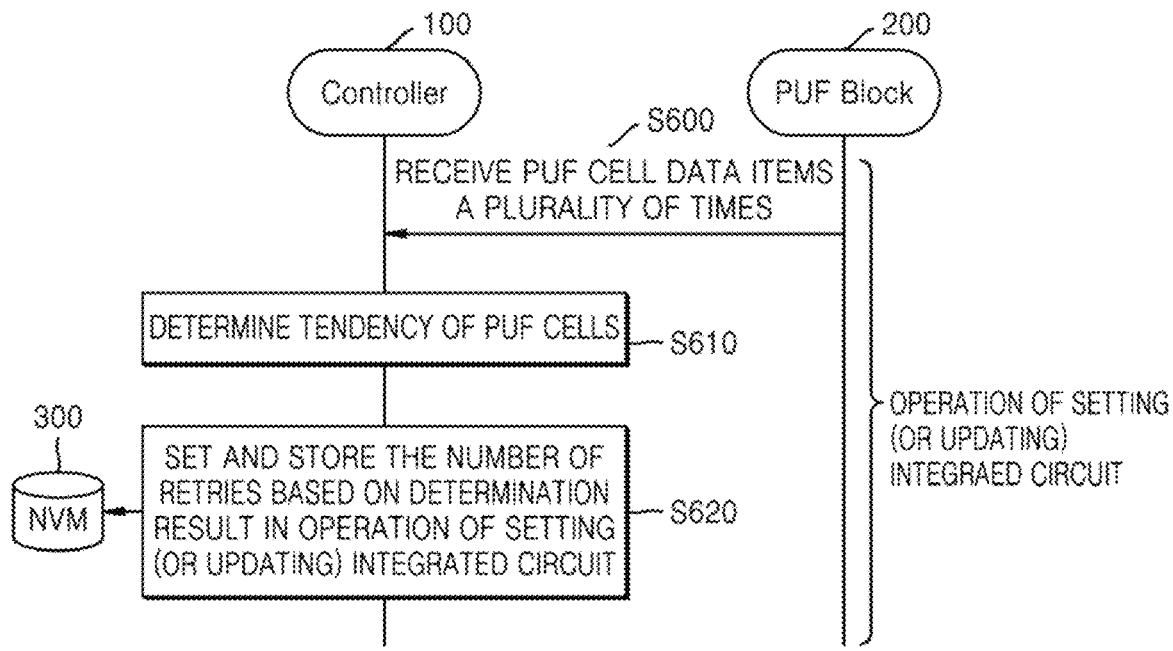
FIGS. 14A and 14B are views illustrating operation of setting (or updating) the integrated circuit of FIG. 1.
Figure 14B:
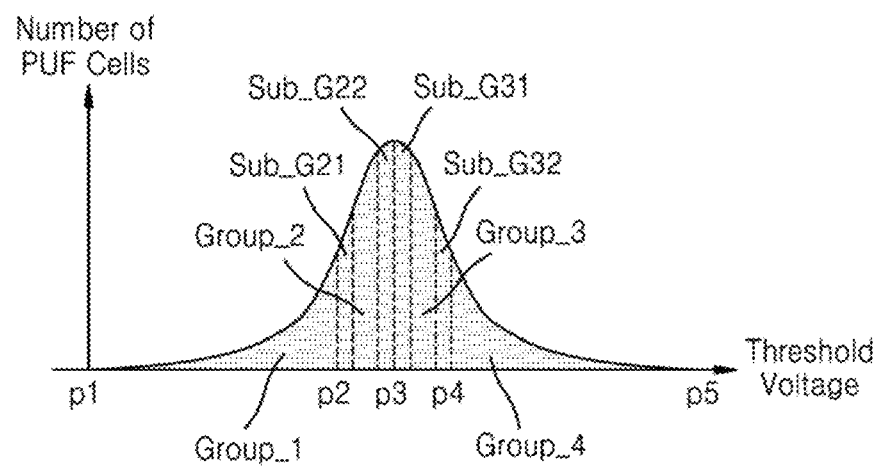

FIGS. 14A and 14B are views illustrating the operation of setting (or updating) the integrated circuit 10 of FIG. 1.

Referring to FIGS. 1 and 14A, in operation S600, the controller 100 may receive the PUF cell data a plurality of times from the plurality of PUF cells of the PUF block 200 in the operation of setting (or updating) the integrated circuit 10. In operation S610, the controller 100 may determine the tendency of the plurality of PUF cells by using the PUF cell data. Thus, in some example embodiments, the controller 100 may determine to what degree a PUF cell data value of a PUF cell changes. In some example embodiments, when the PUF cell data value of the PUF cell changes a number of times greater than a threshold value, the controller 100 may determine that the probability that the PUF cell data value of the PUF cell changes is high, and such a tendency may be considered in setting the number of retries corresponding to the corresponding PUF cell. In operation S620, the controller 100 may set the number of retries based on the determination result of operation S610, may arrange the number of retries in the address table, and may store the address table in the non-volatile memory 300.

Referring to FIG. 14B, PUF cells with the tendency in which the probability that the PUF cell data value changes is high are included in first and second PUF cell subgroups Sub_G21 and Sub_G22 of the second PUF cell group Group_2, and PUF cells with the tendency in which the probability that the PUF cell data value changes is high are included in third and fourth PUF cell subgroups Sub_G31 and Sub_G32 of the third PUF cell group Group_3. The controller 100 may set the number of retries of PUF cells included in first to fourth PUF subgroups Sub_G21, Sub_G22, Sub_G31, and Sub_G32 to be greater than the number of retries of other PUF cells, as only an example embodiment. The number of retries of the PUF cells included in the first to fourth PUF subgroups Sub_G21, Sub_G22, Sub_G31, and Sub_G32 may be set to be less than or equal to the number of retries of other PUF cells.

Figure 15:
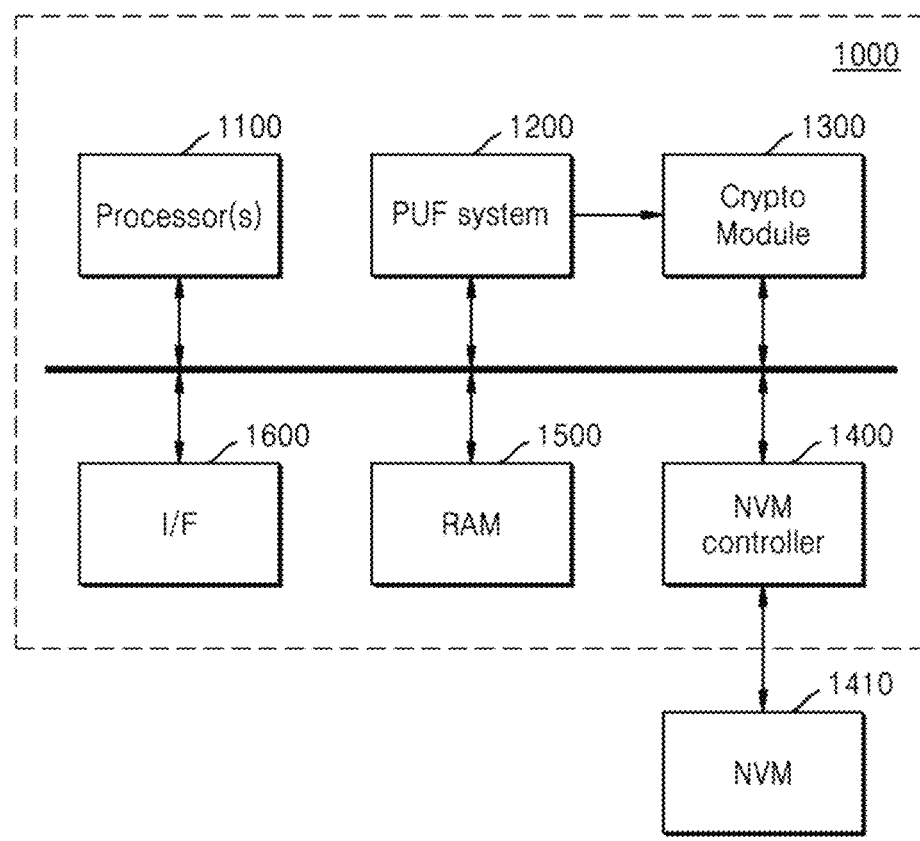
FIG. 15 is a block diagram illustrating an electronic device according to an example embodiment.

FIG. 15 is a block diagram illustrating an electronic device 1000 according to an example embodiment.

The electronic device 1000 may be one of various kinds of electronic devices performing encryption or security authentication of data, such as an application processor, a smart card integrated chip (IC), a mobile device, a data storage medium such as a solid state drive (SSD), a memory stick, a universal flash storage (UFS) device, a memory card, a secure digital (SD) card, a multimedia card (MMC), or an eMMC, and a security device.

Referring to FIG. 15, the electronic device 1000 may include at least one processor 1100, a PUF system 1200, a cryptographic module 1300, a non-volatile memory controller 1400, a non-volatile memory 1410, random access memory (RAM) 1500, and an interface 1600. The electronic device 1000 may further include other components such as a communication module and an input and output device.

The processor 1100 may control all operations of the electronic device 1000. The processor 1100 may be implemented by a central processing unit (CPU) or a microprocessor, and may include a single core or multiple cores.

The RAM 1500 may operate as working memory of an internal system of the electronic device 1000. The RAM 1500 may include at least one of volatile memory and non-volatile memory. A code and/or an application for managing the electronic device 1000 may be loaded on the RAM 1500, and the processor 1100 may execute the code and/or application loaded on the RAM 1500. The code and/or application may be stored in the non-volatile memory 1410 or an additional storage unit.

The interface 1600 may be connected to an input and output device (not shown) through, for example, an RGB interface, a CPU interface, a serial interface, a mobile display digital interface (MDDI), an inter integrated circuit (I2C) interface, a serial peripheral interface (SPI), a micro controller unit (MCU) interface, a mobile industry processor interface (MIPI), an embedded DisplayPort (eDP) interface, a D-subminiature (D-sub) interface, an optical interface, a high definition multimedia interface (HDMI), a mobile high-definition link (MHL) interface, an SD card/MMC interface, or an infrared data association (IrDA) standard interface.

The non-volatile memory controller 1400 may provide an interface between the non-volatile memory 1410 and other components (for example, the processor 1100, the PUF system 1200, and the cryptographic module 1300) of the electronic device 1000. Data to be stored in the non-volatile memory 1410, or data to be read from the non-volatile memory 1410, may be received by the non-volatile memory 1410 under control of the memory controller 1400, or may be read from the non-volatile memory 1410.

The non-volatile memory 1410 may include one of a one-time programmable (OTP) memory, a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM).

In the non-volatile memory 1410, the code and/or application for managing the electronic device 1000 and user data may be stored. In addition, in order to generate the authentication key KEY according to example embodiments, the address table, the reference points, and the reference data pairs generated by the PUF system 1200 may be stored in the non-volatile memory 1410.

The cryptographic module 1300 may perform encryption and decryption on input and output data by using the authentication key KEY provided by the PUF system 1200.

The PUF system 1200 may generate the authentication key KEY used for security. The PUF system 1200 may generate the authentication key KEY in response to the authentication key request signal provided by the processor 1100 or the cryptographic module 1300, and may provide the authentication key KEY to the cryptographic module 1300.

The configuration and operating method of the integrated circuit 10 described with reference to FIGS. 1 to 14B may be applied to the PUF system 1200. The PUF system 1200 may be implemented by hardware, a combination of hardware and software, or a combination of hardware and firmware.

The PUF system 1200 according to an example embodiment may generate the authentication key KEY including the plurality of element keys by receiving the PUF cell data pairs with reference to the address table in the authentication operation, and comparing the PUF cell data pairs with the reference data pairs.

The address table according to an example embodiment may be formed to represent a relationship in which the PUF cell groups are mapped to have a predetermined mismatch distance, and the PUF system 1200 may previously generate the address table in the operation of setting the integrated circuit 10.

By way of summation and review, a security technology having a physically unclonable function (PUF) may be desirable. A PUF cell may be implemented in a semiconductor chip by using a process deviation generated in semiconductor manufacturing processes, and may generate a random value that is difficult to predict. When a key is generated by using the PUF cell, it may be possible to prevent an important key (such as an authentication key stored in a security device) from being copied.

A plurality of PUF cells may include weak PUF cells (in which a key value may change in high probability) and strong PUF cells (in which a key value may change in low probability) due to a change in a PUF cell characteristic. In order to secure reliability of the authentication key generated by using the plurality of PUF cells, the weak PUF cells may be selected and may be excluded from generating the authentication key. In order to select the weak PUF cells, values caused by characteristics of the weak PUF cells may be sorted so as to be subdivided, and a complex logic such as analog-digital converter (ADC) may thus be used. However, the ADC may increase the cost and an area of an integrated circuit supporting the PUF.

As described above, embodiments relates to an integrated circuit for supporting a physically unclonable function (PUF) with a reduced bit error rate and enhance reliability, without a complex logic, and a method of operating the same.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An integrated circuit for a physically unclonable function (PUF), the integrated circuit comprising:
   a controller configured to generate a control signal with reference to an address table, the address table representing a first mapping relationship between a first PUF cell group and a second PUF cell group having a first predetermined mismatch distance in relation to a PUF cell characteristic, and representing a second mapping relationship between a third PUF cell group and a fourth PUF cell group having a second predetermined mismatch distance in relation to the PUF cell characteristic; and
   a PUF block configured to provide PUF cell data groups in accordance with the first and second mapping relationships to the controller, in response to the control signal,
   wherein the controller is configured to generate an authentication key by respectively comparing the PUF cell data groups with reference data groups,
   and wherein, when an $n^{th}$ PUF cell data group among the PUF cell data groups is not matched with the reference data groups, the controller is configured to determine whether values of specific bits of the $n^{th}$ PUF cell data group are equal to each other, and generate an $n^{th}$ element key corresponding to the $n^{th}$ PUF cell data group based on a result of the determination.

2. The integrated circuit as claimed in claim 1, wherein the PUF block is configured to include PUF cells that form a threshold voltage distribution, and which are divided into the first to fourth PUF cell groups in accordance with a magnitude of a threshold voltage.

3. The integrated circuit as claimed in claim 2, wherein the first PUF cell group corresponds to a first region that is lowest in the threshold voltage distribution, the second PUF cell group corresponds to a second region that is second highest in the threshold voltage distribution, the third PUF cell group corresponds to a third region that is second lowest in the threshold voltage distribution, and the fourth PUF cell group corresponds to a fourth region that is highest in the threshold voltage distribution.

4. The integrated circuit as claimed in claim 2, wherein the address table includes:
   information in which addresses of PUF cells included in the first PUF cell group are mapped to addresses of PUF cells included in the second PUF cell group; and
   information in which addresses of PUF cells included in the third PUF cell group are mapped to addresses of PUF cells included in the fourth PUF cell group.

5. The integrated circuit as claimed in claim 1, wherein, for an $n^{th}$ PUF cell data group among the PUF cell data groups, the controller is configured to generate an $n^{th}$ element key with a value fitting a reference data pair, among the reference data groups, that is matched with the $n^{th}$ PUF cell data group.

6. The integrated circuit as claimed in claim 1, wherein, when an $n^{th}$ PUF cell data group among the PUF cell data groups is not matched with the reference data groups, the controller is configured to retry to generate an $n^{th}$ element key corresponding to the $n^{th}$ PUF cell data group.

7. The integrated circuit as claimed in claim 6, wherein, when a number of retries to generate the $n^{th}$ element key is greater than a predetermined number of retries, the controller is configured to update the address table so that the $n^{th}$ PUF cell data group is not used to generate the authentication key.

8. The integrated circuit as claimed in claim 7, wherein the controller is configured to:
   generate a notification signal notifying that the $n^{th}$ element key of the $n^{th}$ PUF cell data group may not be generated, and
   provide the generated notification signal to an external host.

9. The integrated circuit as claimed in claim 1, wherein:
   the specific bits represent that each of corresponding PUF cells of the $n^{th}$ PUF cell data group has an upper or lower 50% threshold voltage, and
   the controller is configured to generate the $n^{th}$ element key with a value that fits values of the specific bits when the specific bits of the $n^{th}$ PUF cell data group are equal to each other.

10. The integrated circuit as claimed in claim 1, wherein, in an operation of setting the integrated circuit, the controller is configured to generate the address table by:
    dividing PUF cells of the PUF block into the first to fourth PUF cell groups based on unique signals received from the PUF cells, and
    mapping addresses of the PUF cells to fit the first and second mapping relationships.

11. An integrated circuit for a physically unclonable function (PUF), the integrated circuit comprising:
    a PUF block configured to include PUF cells; and
    a controller configured to receive PUF cell data pairs in accordance with a first mapping relationship and a second mapping relationship, the first mapping relationship being between a first PUF cell group and a second PUF cell group having a first predetermined mismatch distance in relation to a PUF cell characteristic, and the second mapping relationship being between a third PUF cell group and a fourth PUF cell group having a second predetermined mismatch distance in relation to the PUF cell characteristic, wherein the controller is configured to generate element keys that form an authentication key by respectively comparing the PUF cell data pairs with reference data pairs, and wherein the controller is configured to generate an element key corresponding to at least one PUF cell data pair by determining whether specific bits of the at least one PUF cell data pair that are not matched with the reference data pairs are equal to each other.

12. The integrated circuit as claimed in claim 11, wherein the controller is configured to:
generate the element keys corresponding to the PUF cell data pairs based on a matching result between the PUF cell data pairs and the reference data pairs, and
output the elements keys to an external host.

13. The integrated circuit as claimed in claim 11, wherein the controller is configured to:
re-read at least one PUF cell data pair that is not matched with the reference data pairs, and
generate a second element key corresponding to the at least one PUF cell data pair.

14. The integrated circuit as claimed in claim 11, wherein:
the specific bits represent that each of corresponding PUF cells of an $n^{th}$ PUF cell data group has an upper or lower 50% threshold voltage, and
the controller is configured to generate the element key having a value that fits values of the specific bits and corresponding to the at least one PUF cell data pair when the specific bits of the at least one PUF cell data pair are equal to each other.

15. The integrated circuit as claimed in claim 11, wherein, in response to an authentication key request signal received from an external host, the controller is configured to:
provide a control signal for requesting the PUF cell data pairs to the PUF block, based on an address table representing the first and second mapping relationships.

16. The integrated circuit as claimed in claim 15, wherein, in an operation of setting the integrated circuit, the controller is configured to generate the address table by:
dividing the PUF cells of the PUF block into the first to fourth PUF cell groups based on unique signals that are received from the PUF cells, and
mapping addresses of the PUF cells to fit the first and second mapping relationships.

17. The integrated circuit as claimed in claim 16, wherein:
the PUF cells form a threshold voltage distribution, and
the first PUF cell group corresponds to a first region that is lowest in the threshold voltage distribution, the second PUF cell group corresponds to a second region that is second highest in the threshold voltage distribution, the third PUF cell group corresponds to a third region that is second lowest in the threshold voltage distribution, and the fourth PUF cell group corresponds to a fourth region that is highest in the threshold voltage distribution.

18. A method of operating an integrated circuit that includes a controller and a physically unclonable function (PUF) block, the method comprising:
receiving an authentication key request at the controller;
wherein the controller is configured to generate a control signal with reference to an address table, the address table representing a first mapping relationship between a first PUF cell group and a second PUF cell group having a first predetermined mismatch distance in relation to a PUF cell characteristic, and representing a second mapping relationship between a third PUF cell group and a fourth PUF cell group having a second predetermined mismatch distance in relation to the PUF cell characteristic;
in response to the authentication key request received by the controller, providing the control signal from the controller to the PUF block, the control signal being for reading PUF cell data pairs corresponding to first PUF cells and second PUF cells that make pairs with the first PUF cells;
in response to the control signal, providing the PUF cell data pairs from the PUF block to the controller;
comparing the PUF cell data pairs respectively with reference data pairs, wherein the comparing is performed by the controller;
generating an authentication key from the controller based on a result of the comparison, the authentication key including element keys corresponding to the PUF cell data pairs; and
generating an element key corresponding to at least one PUF cell data pair by determining whether specific bits of the at least one PUF cell data pair that are not matched with the reference data pairs are equal to each other.

* * * * *